United States Patent
Ross (10) Patent No.: US 12,008,551 B2
(45) Date of Patent: *Jun. 11, 2024

(54) LAYERED SECURITY FOR AGE VERIFICATION AND TRANSACTION AUTHORIZATION

(71) Applicant: CardLogix, Irvine, CA (US)

(72) Inventor: Bruce Ross, Irvine, CA (US)

(73) Assignee: CARDLOGIX, Irvine, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 17/467,130

(22) Filed: Sep. 3, 2021

(65) Prior Publication Data

US 2021/0398108 A1 Dec. 23, 2021

Related U.S. Application Data

(63) Continuation of application No. 13/689,683, filed on Nov. 29, 2012, now Pat. No. 11,132,672.

(51) Int. Cl.
*G06Q 20/36* (2012.01)
*G06Q 20/38* (2012.01)
*H04L 9/40* (2022.01)

(52) U.S. Cl.
CPC ..... *G06Q 20/3674* (2013.01); *G06Q 20/3821* (2013.01); *G06Q 20/3823* (2013.01);
(Continued)

(58) Field of Classification Search
None
See application file for complete search history.

(56) References Cited

U.S. PATENT DOCUMENTS 6,735,695 B1 5/2004 Gopalakrishnan et al.
7,813,822 B1 * 10/2010 Hoffberg ........... H04N 7/163
381/73.1

(Continued)

FOREIGN PATENT DOCUMENTS

AU 2010248794 A1 * 12/2011 ........... G06F 21/31
CA 2955282 A1 * 1/2012 ........... G06F 21/83

(Continued)

OTHER PUBLICATIONS

Q. Li, X. Zhang, J.-P. Seifert and H. Zhong, "Secure Mobile Payment via Trusted Computing," 2008 Third Asia-Pacific Trusted Infrastructure Technologies Conference, Wuhan, China, 2008, pp. 98-112, doi: 10.1109/APTC.2008.24. (Year: 2008).*

(Continued)

*Primary Examiner* — El Mehdi Oussir
(74) *Attorney, Agent, or Firm* — Haynes and Boone, LLP (57) ABSTRACT

A user may be willing to purchase items or participate in a pay-for service offered by a service provider. A service provider may wish to verify characteristics of the user prior to allowing transactions to take place, and may want to secure the transactions once the transactions are allowed. A credential issued to a user and a transaction application uploaded to a user device may be used to secure transactions between the user and a service provider interface, such as a webserver or a point-of-sale. The transaction application may capture real-time user data and comparing the real-time user data to prior user data stored on the credential, authenticate the service provider interface to the user and the user to the service provider interface; and establish an encrypted session between the service provider interface and the transaction application adapted to authenticate the transactions between the user and the service provider interface.

19 Claims, 4 Drawing Sheets

(52) U.S. Cl.
CPC ...... *H04L 63/0853* (2013.01); *H04L 63/0861* (2013.01); *H04L 63/0869* (2013.01)

(56) References Cited

U.S. PATENT DOCUMENTS

| | | | |
|---|---|---|---|
| 7,953,979 B2 | 5/2011 | Borneman et al. | |
| 8,316,237 B1 | 11/2012 | Felsher et al. | |
| 8,458,462 B1 | 6/2013 | Hanna | |
| 8,613,070 B1* | 12/2013 | Borzycki | H04L 67/104 726/8 |
| 8,639,629 B1* | 1/2014 | Hoffman | G06Q 20/3821 705/64 |
| 8,768,838 B1* | 7/2014 | Hoffman | G06Q 40/00 705/72 |
| 8,863,237 B2 | 10/2014 | Pahlavan et al. | |
| 9,396,450 B2* | 7/2016 | Gazdzinski | G07F 17/0014 |
| 9,563,761 B1* | 2/2017 | Ziraknejad | G06F 21/32 |
| 9,876,788 B1* | 1/2018 | Ziraknejad | G06F 21/34 |
| 10,701,067 B1* | 6/2020 | Ziraknejad | H04W 12/63 |
| 10,915,904 B2 | 2/2021 | Conway | G06F 3/04886 |
| 10,991,242 B2* | 4/2021 | Taylor | H04Q 9/00 |
| 11,403,630 B2* | 8/2022 | Dua | H04W 12/06 |
| 2002/0027992 A1 | 3/2002 | Matsuyama et al. | |
| 2002/0029340 A1 | 3/2002 | Pensak et al. | |
| 2003/0037261 A1 | 2/2003 | Meffert et al. | |
| 2003/0046237 A1 | 3/2003 | Uberti | |
| 2004/0230536 A1* | 11/2004 | Fung | G06Q 20/382 705/64 |
| 2005/0246292 A1* | 11/2005 | Sarcanin | G06Q 20/102 705/67 |
| 2006/0174323 A1 | 8/2006 | Brown et al. | |
| 2006/0206429 A1* | 9/2006 | Martinez | G06Q 99/00 705/50 |
| 2007/0162518 A1 | 7/2007 | Tian | |
| 2007/0171921 A1 | 7/2007 | Wookey et al. | |
| 2007/0186106 A1* | 8/2007 | Ting | H04L 63/0815 713/168 |
| 2007/0223685 A1 | 9/2007 | Boubion et al. | |
| 2008/0097924 A1 | 4/2008 | Carper et al. | |
| 2008/0179401 A1 | 7/2008 | Hart et al. | |
| 2008/0235779 A1 | 9/2008 | Bogner | |
| 2008/0249938 A1* | 10/2008 | Drake-Stoker | H04W 12/106 726/2 |
| 2009/0132813 A1* | 5/2009 | Schibuk | G06Q 20/4014 726/9 |
| 2009/0210347 A1* | 8/2009 | Sarcanin | G06Q 20/38215 705/76 |
| 2009/0292641 A1* | 11/2009 | Weiss | G06F 21/6245 705/72 |
| 2009/0307142 A1* | 12/2009 | Mardikar | G06Q 20/3821 705/72 |
| 2010/0017599 A1 | 1/2010 | Sellars et al. | |
| 2010/0299556 A1* | 11/2010 | Taylor | G07F 17/3239 714/55 |
| 2011/0138176 A1* | 6/2011 | Mansour | H04L 63/0861 713/168 |
| 2011/0138450 A1 | 6/2011 | Kesanupalli et al. | |
| 2011/0202755 A1 | 8/2011 | Orsini et al. | |
| 2011/0221568 A1* | 9/2011 | Giobbi | H04W 12/06 340/5.82 |
| 2012/0069131 A1 | 3/2012 | Abelow | |
| 2012/0078751 A1* | 3/2012 | MacPhail | G06Q 20/12 705/26.41 |
| 2012/0167162 A1 | 6/2012 | Raleigh et al. | |
| 2012/0284506 A1 | 11/2012 | Kravitz et al. | |
| 2013/0083926 A1* | 4/2013 | Hughes | H04L 9/3247 380/278 |
| 2013/0159705 A1 | 6/2013 | Leedom, Jr. | |
| 2013/0262317 A1* | 10/2013 | Collinge | G06Q 20/3265 705/72 |
| 2014/0032691 A1 | 1/2014 | Barton et al. | |
| 2014/0032759 A1 | 1/2014 | Barton et al. | |
| 2014/0040979 A1 | 2/2014 | Barton et al. | |
| 2014/0098671 A1* | 4/2014 | Raleigh | H04M 15/61 370/235 |
| 2014/0172724 A1* | 6/2014 | Dua | G06Q 20/325 705/76 |
| 2014/0310182 A1* | 10/2014 | Cummins | G06Q 20/3274 705/72 |
| 2014/0359003 A1 | 12/2014 | Sullad et al. | |
| 2015/0067035 A1 | 3/2015 | Sullad et al. | |
| 2016/0099972 A1 | 4/2016 | Qureshi et al. | |
| 2016/0308682 A1 | 10/2016 | Lund et al. | |
| 2017/0011573 A1* | 1/2017 | Belhadia | H04W 4/80 |
| 2017/0078922 A1* | 3/2017 | Raleigh | H04L 69/18 |
| 2017/0300678 A1* | 10/2017 | Metke | H04W 12/068 |
| 2017/0364671 A1* | 12/2017 | Mullin | G06V 10/95 |
| 2018/0039786 A1 | 2/2018 | Naqvi et al. | |
| 2020/0168229 A1* | 5/2020 | Manchireddy | H04W 4/80 |
| 2020/0273040 A1* | 8/2020 | Novick | G06Q 20/4016 |
| 2021/0075825 A1* | 3/2021 | Davis | H04L 63/1416 |
| 2021/0090697 A1* | 3/2021 | Weiss | H04L 63/0861 |
| 2021/0286868 A1* | 9/2021 | Kragh | H04W 4/90 |
| 2022/0383325 A1* | 12/2022 | Hoffman | G06Q 20/4018 |
| 2022/0394468 A1* | 12/2022 | Avetisov | H04L 63/083 |
| 2023/0043318 A1* | 2/2023 | Selman | G06Q 20/3821 |
| 2024/0013225 A1* | 1/2024 | Novick | G06Q 20/10 |

FOREIGN PATENT DOCUMENTS

| | | | | |
|---|---|---|---|---|
| CA | 2787623 C | * | 7/2018 | ........ H04L 63/0815 |
| CN | 1833398 A | * | 9/2006 | ............ G06F 21/31 |
| CN | 101939946 A | * | 1/2011 | ........ G06F 21/6209 |
| CN | 101375546 B | * | 9/2012 | .......... G06F 21/316 |
| CN | 104954485 | | 9/2015 | |
| CN | 103229450 B | * | 9/2016 | ........ G06F 12/1408 |
| CN | 103270516 B | * | 10/2016 | ............ G06F 21/53 |
| CN | 110462654 A | * | 11/2019 | ............ G06F 16/00 |
| CN | 112805737 A | * | 5/2021 | ............ G06Q 20/02 |
| CN | 113822664 A | * | 12/2021 | ........ G06Q 20/3274 |
| EP | 3933734 A1 | * | 1/2022 | ............ G06Q 20/20 |
| JP | 2010533344 A | | 7/2008 | |
| JP | 2009020853 A | * | 1/2009 | ............ G06F 15/00 |
| JP | 2009277089 A | * | 11/2009 | ............ H04L 63/08 |
| JP | 5730907 B2 | * | 6/2015 | ........ H04L 63/0815 |
| WO | WO-2005001751 A1 | * | 1/2005 | ............ G06F 21/32 |
| WO | WO-2005117527 A2 | * | 12/2005 | ............ H04L 9/0833 |
| WO | WO-2010019706 A1 | * | 2/2010 | ............ G06F 21/31 |
| WO | WO-2019032301 A1 | * | 2/2019 | ........ H04L 63/0861 |
| WO | WO-2020260483 A1 | * | 12/2020 | ............ G06F 21/32 |
| WO | WO-2021097130 A1 | * | 5/2021 | ............ G06F 21/32 |

OTHER PUBLICATIONS

Raina, Vibha. Integration of Biometric authentication procedure in customer oriented payment system in trusted mobile devices. (IJITCS) vol. 1, No. 6. https://www.idc-nline.com/technical_references/pdfs/data_communications/Integration%20of%20Biometric.pdf (Year: 2011).*

Xi K., et al., A fingerprint based bio-cryptographic security protocol designed for client/server authentication in mobile computing environment. Security and Communication Networks 487-499. https://onlinelibrary.wiley.com/doi/pdf/10.1002/sec.225 (Year: 2010).*

Raina, Vibha K. Integration of Biometric authentication procedure in customer oriented payment system in trusted mobile devices. (IJITCS) vol. 1, No. 6. https://www.idc-online.com/technical_references/pdfs/data_communications/Integration%20of%20Biometric.pdf (Year: 2011).*

Light et al. "An Efficient Wireless Communication Protocol for Secured Transmission of Content-sensitive Multimedia Data" World of Wireless, Mobile and Multimedia Networks&Workshops, 2009, WOWMOM 2009, IEEE International Symposium on A, Piscataway, NJ (USA), Jun. 15, 2009, XP031543578 (3 pages).

Search Report from International Patent Application No. PCT/US2012/067141 mailed Mar. 5, 2013 (11 pages).

Office Action from European Patent Application No. 12808961.2 mailed Feb. 3, 2017 (7 pages).

(56) References Cited

OTHER PUBLICATIONS

Marie-Pier Pelletier; Martin Trepanier; Catherine Morency. Smart card data use in public transit: A literature review. Transportation Research Part C: Emerging Technologies. Volume 19, Issue 4, Aug. 2011, pp. 557-568. (Year: 2011).

Entrust. Understanding Digital Certificates & Secure Sockets Layer. Securing your digital life. May 2007. p. 1-11.

Lakshmi, B. et al. Real Time Cryptography with Dual Key Encryption. IEEE, 2008.

* cited by examiner

LAYERED SECURITY FOR AGE VERIFICATION AND TRANSACTION AUTHORIZATION

CROSS-REFERENCE TO RELATED APPLICATIONS

This application is a continuation of U.S. patent application Ser. No. 13/689,683 filed Nov. 29, 2012 and entitled "LAYERED SECURITY FOR AGE VERIFICATION AND TRANSACTION AUTHORIZATION," which claims the benefit of U.S. Provisional Patent Application No. 61/564,588 filed Nov. 29, 2011 and entitled "LAYERED SECURITY SYSTEM FOR AGE VERIFICATION AND AUTHORIZING TRANSACTIONS USING SPECIALLY FORMATTED SMART CARDS" which is hereby incorporated by reference in its entirety.

BACKGROUND

Field of the Invention

The present invention generally relates to transaction authorization and more particularly to transaction authorization involving age verification.

Related Art

Electronic commerce is an important concept for businesses attempting to compete in the modern economy. Electronic commerce can be used to expand a consumer base from local sales to worldwide sales almost instantly, and the cost associated with developing and operating a system supporting electronic commerce can be relatively low compared to more conventional methods. However, the growth of electronic commerce has resulted in a commensurate growth in electronic fraud.

Electronic fraud often takes place on the user or consumer end of an electronic commerce transaction system. To encourage a large number of sales, the transaction system should be open to access to a wide array of consumers, and so it is usually not cost effective to blindly limit user access. Electronic fraud can also take place on the business or service provider end, and a large number of users can be defrauded in a short amount of time if the business supplying the transaction system is not trustworthy.

SUMMARY

According to one embodiment, a method for securing transactions between a user and a service provider interface may involve a credential issued to the user and a transaction application uploaded to a user device. The method may include verifying a characteristic of the user by capturing real-time user data and comparing the real-time user data to prior user data stored on the credential, establishing an SSL tunnel between the service provider interface and the transaction application, authenticating the service provider interface to the user and the user to the service provider interface using the SSL tunnel, the prior user data stored on the credential, and secure data stored on a trusted server, and establishing an encrypted session between the service provider interface and the transaction application adapted to authenticate the transactions between the user and the service provider interface.

In some embodiments, the method may include enrolling the user prior to verifying the characteristic of the user, where the enrolling can include capturing the prior user data, transmitting the prior user data to the trusted server, copying the prior user data to the credential, and issuing the credential to the user.

In another embodiment, a system for securing transactions between a user and a service provider interface may involve a credential issued to the user and a transaction application uploaded to a user device. The system may include one or more memories storing prior user data, secure data, or the transaction application, wherein the prior user data may reside on the credential, the secure data may reside on a trusted server, and the transaction application may reside, at least in part, on the user device. The system may also include one or more processors in communication with the memories adapted to verify a characteristic of the user by capturing real-time user data and comparing the real-time user data to the prior user data stored on the credential, establish an SSL tunnel between the service provider interface and the transaction application, authenticate the service provider interface to the user and the user to the service provider interface using the SSL tunnel, the prior user data, and the secure data, and establish an encrypted session between the service provider interface and the transaction application adapted to authenticate the transactions between the user and the service provider interface.

In some embodiments, one or more processors of the system may be further adapted to enroll the user prior to verifying the characteristic of the user, where the enrolling can include capturing the prior user data, transmitting the prior user data to the trusted server, copying the prior user data to the credential, and issuing the credential to the user.

In a further embodiment, a non-transitory machine-readable medium may include a plurality of machine-readable instructions which when executed by one or more processors of a user device are adapted to cause the user device to perform a method for securing transactions between a user and a service provider interface. The method may involve a credential issued to the user and a transaction application uploaded to the user device. The method may include verifying a characteristic of the user by capturing real-time user data and comparing the real-time user data to prior user data stored on the credential, establishing an SSL tunnel between the service provider interface and the transaction application, authenticating the service provider interface to the user and the user to the service provider interface using the SSL tunnel, the prior user data stored on the credential, and secure data stored on a trusted server, and establishing an encrypted session between the service provider interface and the transaction application adapted to authenticate the transactions between the user and the service provider interface.

In one embodiment, a credential may be implemented as a smart card or a secure access module (SAM).

These and other features and advantages of the present invention will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

One embodiment of the present invention is directed at the implementation of a smart card transaction system involving the integration of both hardware and software design elements. The philosophy behind this is the utilization of middleware and hardware elements to build a low-cost, secure platform for loyalty and stored value that can work across many transaction systems and reader types. This minimizes the many problems faced by casinos, restaurants, entertainment venues and theater companies around the world that have multiple point-of-sale (POS) suppliers and operating systems throughout their businesses. The currently envisioned embodiments could support many types of cards for each business i.e., gift certificates, loyalty cards, employee access and VIP cards.

In one embodiment, each business may be issued a middleware component matched to their platform requirements. The middleware may have authentication, encryption, and decryption functions integrated into it that are matched to that business's issued cards. The encryption and decryption may be handled entirely by the middleware and can be configured to maintain a high level of security. Each card may include unique identification information and/or biometric modalities with which the middleware and transaction system/database can compare for authentication and use. The unique identification information can identify the card, type and individual user. The transaction system should perform an identification information-to-value comparison on a regular basis. In one embodiment, the technological aspects of such a system may include the combining of on-line and off-line approaches to maintaining record integrity and processing the information, e.g. syncing of the data.

When one combines many information types (e.g., value, points and demographics) on a single card, user and card distribution issues can arise. By using a specially formatted smart card that can be matched to a system, these problems may be reduced or eliminated.

Embodiments of the invention enable the secure use of low cost protected memory based smart cards by implementing data security through a variety of mechanisms, such as those set forth herein.

Embodiments of the invention provide for securely addressing the users and issuers requirements for Data Integrity, Non Repudiation, Access Control, Confidentiality and Authentication.

Many of the problems associated with changing transaction systems and suppliers are addressed by allowing a business to manage a middleware that their card system is linked to. This creates autonomy for the business and allows them to merge their data operations with others if they choose. This independence from individual POS companies also reduces or eliminates a need to reissue cards each time there is a change to the POS systems.

Smart card technology is increasingly used for retail, e-commerce and enterprise data security applications. The smart card can act as a miniature PC with its own processor/memory architecture, using an operating system on which applications are executed, or it can be a secure storage device that limits access to its contents by its on board logic.

Applications that utilize smart cards can be built to recognize and authorize cards either through a common on-line network or through any of the GSM phone systems used today. In some larger banking systems and stored value systems deployed today, such as the EMV platform or Common Electronic Purse Standard, smart cards can be authenticated through a common network, or the value exchange can take place through a dedicated loaded application.

Smart cards can be authenticated off-line by a dedicated application. The authentication application can be uploaded to terminals or can reside on an additional type of smart card called a Secure Access Module (SAM). In some systems, a first application receives data from a smart card and requests authentication from the SAM. Another method involves dedicating an entire application and system to a card type.

In the past, network security was primarily the concern of enterprises engaged in security sensitive industries. Banks and financial institutions generally used some form of security technology, such as encryption, to protect customer transactions such as inter-bank transfers. Increasingly, however, financial institutions and businesses are extending the services across the Internet and are implementing additional security measures adapted to the Internet infrastructure.

The development of electronic commerce, and extranet and Intranet applications, has substantially increased network complexity for all users. The risk of network fraud and the challenge of maintaining online confidentially have increased at an astronomic pace. Unauthorized intrusions, falsifications, and damage on computer networks are extremely costly. Individuals and business increasingly rely upon computer networks, including the Internet, to communicate, access information, and conduct commerce. Businesses are now employing local area networks to connect computer users located in a single facility and wide area networks to connect to customers remotely. This online business environment has different security requirements than traditional environments. Enterprise networks are no longer defined by the physical boundaries of a business location but often encompass remote sites and include mobile users and telecommuters around the world. These changes introduce additional security concerns because of the increased use of remote access and extranets and the reliance on shared public networks such as the Internet. Security requirements have become much more complex.

The Internet significantly influences business operations, from the distribution of information to business logistics, from consumer retailing to entertainment, and from banking and finance to customer service. The migration towards Internet-dependent business models is occurring at a rapid pace and is changing the nature of how enterprises conduct business. Disparate transaction systems are common in today's retail environments even among the same company. Businesses are trying to develop strategies to manage the complexities brought on by growth and the opportunities made possible by the Internet.

Smart card security today involves products that are focused in enterprise information technology. Some government and industry organizations have standardized the classification of data security as follows:

ACCESS CONTROL can refer to managing access rights to sensitive information and is a basic feature of operating system platforms and file systems.

CONFIDENTIALITY can involve the encryption of data transmissions so that only the intended recipient can securely access the information.

DATA INTEGRITY can refer to ensuring that data is not compromised or manipulated.

NON-REPUDIATION can refer to providing undeniable proof that transactions, once committed, are valid, binding, and irrevocable.

AUTHENTICATION can refer to proving or verifying the identity of users and systems on the network.

Authentication can be a critical component of access control, confidentiality, data integrity and non-repudiation. To provide access to the network or to sensitive information, the network often must be able to identify the user accurately. Business systems, services and applications can authenticate users using a variety of digital credentials, including passwords, digital signatures, and smart cards.

Public Key Infrastructure (PKI) is one example technology used to implement network security, including access control to information from web browsers, secure e-mail, signing digital forms, firewalls, routers supporting VPNs, and networked directories. PKI employs a public-private key pair rather than solely a secret key to encrypt and decrypt data and generate digital signatures and certificates.

Digital certificates are secure data files that can contain a user's public key along with other user identification information. The public key can be made available to anyone who wants it, but only its owner holds the corresponding private key. Senders use the public key to encrypt data to be sent to a user, and the user then decrypts the data by employing the corresponding private key. Smart cards can be one of the safest places to store and manage an individual's digital certificate and key pairs.

In one embodiment, a smart card can be a microprocessor based device that can independently generate a key used as a starting point for a transaction session. The card and the system can be configured to mutually authenticate each other and a session key may be generated and used for that particular transaction or set of transactions.

In many software applications, system functions can be separated into modules. For example, a top layer can be described as a Graphical User Interface or GUI. This layer can be what a user sees on a computer screen and perceives as the application. Below this layer are corresponding lower layers that can be used to facilitate a particular function, such as accessing a database of customers that are important to an enterprise. Many of these modules or layers are common to each development environment or tool that they were written from, such as Visual Basic or C++. They may include pre-written scripts that perform some mundane task for the application that is common among many applications or programs. Machine-to-machine software layers can be referred to as middleware. These types of layers in software can be referred to by many names, such as DLLs, OCXs and library files. Middleware can be associated with hardware that interfaces with the software.

One embodiment of such a methodology is the Multi-factor Age Verification System by CardLogix. CardLogix offers specific middleware and matching secure smart card solutions that enable easy integration with existing gaming and online gaming systems. The software and smart cards can also be used to control or facilitate operation of POS systems that distribute adult content such as music or films digitally.

Another embodiment involves movie ticketing. Smart card-enhanced ticketing can reduce box-office bottlenecks and manage unused card balances and residuals on balances that are never used. For example, the Movie Gold Card middleware can be configured to support Internet-based ticketing solutions. Pre-paid tickets, concessions and/or theater cash can be stored on the Movie Gold Card. When the smart card is used in a self-service kiosk, or at any smart card reader that is connected to a POS, the ticket value can be deducted from the smart card. CardLogix Movie Gold Card Middleware can be configured to integrate with a theater's POS system, and in particular, a POS system offering a consumer driven touch-screen interface for movie and refreshment choices. The smart card reader can also be connected to a personal computer (PC) based system that ties into the theater's POS inventory and accounting system.

A Movie Gold Card Middleware embodiment can be in the form of a middleware realized as an application programming interface (API) including some of the following commands. Tables 1 and 2 below show Movie Gold Card Basic System Middleware commands that match the contents of a specially formatted Movie Gold Card according to one embodiment.

TABLE 1

GENERAL READER COMMANDS

| Command | Description |
| --- | --- |
| CLX_OpenReader | Open the reader and setup the USB or Serial Port. |
| CLX_CloseReader | Closes the Reader. |
| CLX_CloseAll | Closes the all open Readers. |
| CLX_APIVersion | Get the API version number. |
| CLX_ResetReader | Issues a soft reset to the Reader. |
| CLX_GetReaderVersion | Returns the version string from the Reader. |
| CLX_GetReaderStatus | Returns the status of the reader. |
| CLX_CardInserted | Determines if a card is inserted in the Reader. |
| CLX_SetReaderLED | Turns on or off the red or green LED on the Reader. |
| CLX_GetError | Returns the detailed error code for the previous command. |

TABLE 2

MOVIE GOLD CARD COMMANDS

| Read Commands | Write Commands | Auto En/Decrypt | |
| --- | --- | --- | --- |
| CLX_ReadB | CLX_WriteB | | Writes and Reads data to and from the Blob card Field buffer |
| CLX_ReadTID | | | Reads data from the Theater ID # field buffer |
| CLX_ReadTL | CLX_WriteTL | YES | Writes and Reads data to and from the Transaction Log # field buffer |
| CLX_ReadTD | CLX_WriteTD | YES | Writes and Reads data to and from the Card Issue Date field buffer |

TABLE 2-continued

MOVIE GOLD CARD COMMANDS

| Read Commands | Write Commands | Auto En/Decrypt | |
|---|---|---|---|
| CLX_ReadVF2 | CLX_WriteVF2 | YES | Writes and Reads data to and from the Value $ field 2 buffer |
| CLX_ReadPF1 | CLX_WritePF1 | YES | Writes and Reads data to and from the Points field 1 buffer |
| CLX_ReadPF2 | CLX_WritePF2 | YES | Writes and Reads data to and from the Points field 2 buffer |
| CLX_ReadTF1 | CLX_WriteTF1 | YES | Writes and Reads data to and from the Ticket Storage field buffer |
| CLX_ReadVF2D | CLX_WriteVF2D | | Writes and Reads data to and from the Value $ field 2 Display buffer |
| CLX_ReadPF1D | CLX_WritePF1D | | Writes and Reads data to and from the Points field 1 Display buffer |
| CLX_ReadPF2D | CLX_WritePF2D | | Writes and Reads data to and from the Points field 2 Display buffer |

Many other embodiments are envisioned for closed applications around the world. Each of these could be adapted to have a common command set for the middleware and a specially formatted card that is matched to this layer of software.

In some embodiments, the present methodology can be adapted for use in an environment where the user/consumer is in a physical location at a designated POS or is connected online via a network such as the internet. In such environments, the user/consumer often needs to prove their identity and present corresponding proof of age for regulatory or social requirements. These embodiments could be in the context of accessing services of a casino, bar, entertainment venue, theater, restaurant or retail business.

In various embodiments, a method of sharing data and or value between a smart card and credential issued to a user and a transaction system can be implemented in a number of ways. For example, the transaction system and credential can be configured to operate while disconnected from a common transaction network, can be dissimilar in manufacturer and/or operating system, can be similar in manufacture but not similar by version, or can be completely similar in manufacture, operating system, and version.

A smart card or credential can take different forms in different embodiments, e.g., SIM card in a cell phone, a smart USB dongle or token, a SD card in all its various configurations, an e-passport or book format, or in a card or keychain format. More generally, such credential can comprise any type of personal memory storage device or data file adapted to be stored on a personal memory storage device. The smart card or credential may communicate through many different protocols across contact or contactless (e.g., WiFi, Bluetooth, RFID, NFC) interfaces.

In some embodiments, a variety of transaction systems can share a common software element (layer) that is embedded in one or more of their associated applications. This layer can be in the form of a DLL, OCX, library file or other types of middleware.

In further embodiments, smart cards or credentials can be adapted to share a common data structure that can be embedded in the credential and is known to the transaction layer/middleware.

In one embodiment, transaction systems may be configured to rely on identification information that is known (e.g., symmetric or asymmetric encryption keys) to the cards and transaction systems, and, such systems can accept or deny access for a particular transaction after a user/consumer presents a second factor for authentication. Such factor can be in many forms, such as a biometric modality (e.g., captured biometric data) and/or a unique personal identification number (PIN) chosen by the user.

In related embodiments, the identification information mentioned in above can be established by way of inspecting and recording (e.g., capturing user information from) legitimate forms of identification (e.g., a driver's license, passport) of the user/consumer. This data along with additional biometric identifiers can be bound and stored in an authorized smart card or credential that can be recognized/accessed by the transaction system via the middleware.

Data on a credential or in a transaction system can be protected by use of encryption algorithms in the middleware that may include, but are not limited to, AES, DES, RSA, Diffie Hellman, Blowfish, and other published and non-published encryption algorithms.

An issued credential can be treated as an avatar or acceptable representative for previously inspected breeder documents (e.g., driver's license, passport) by the transaction system.

In some embodiments, a transaction can be allowed or denied by comparing a biometric modality of the user/consumer bound to or stored on the credential before use with the transaction system to similar information stored elsewhere on the transaction system, for example, or on a trusted server.

In embodiments where a credential is tied to a user/consumer in a transaction environment such as online poker or gaming, regulators can audit user vs. user and user vs. machine play, in addition to auditing age of users.

After a transaction is authorized by the network and a secure channel of communication is established, every transaction can be digitally signed by the system and credential by use of a variety of methods. These methods may include a Digital Signature Algorithm, generating a one way hash from either the card or the host, or combining mathematical factors such as session keys, for example, in order to establish a series of non-reputable transactions.

In some embodiments, the storing data and value can be adapted to allow key-chain, non-decrypting smart card, and non-decrypting credential systems to display the data and value, or a subset of the data and value, without compromising the credential's or system's security.

For example, this can be achieved by storing the relevant information on the credential in at least two places; one of these areas may be available to non-decrypting readers (e.g., credential interfaces) in the clear for display purposes. This can prevent sniffing of the keys and can be adapted to provide another layer of security by checking against the encrypted data/value files. In one embodiment, systems conducting a transaction can be configured to compare data stored in the clear to data in non-directly-readable encrypted areas on the credential. In some embodiments, data can also be verified by performing a comparison to an electronic version of a check register.

In some embodiments, the present methodology can include a business process that allows a business to manage their credential systems by sub-licensing the software layer (e.g., a middleware) referenced above to be included in their transaction systems, which can be provided by a particular vendor or vendors. For example, the software may be licensed by the manufacturer of the smart card or credential to the smart card or credential issuer (e.g., the entity enrolling users and issuing credentials to enrolled users). They in turn may sub-license to each transaction system manufacturer to be included in the system that is associated with the issuer.

In another embodiment, a transaction system may be adapted to provide a secure method of exchanging data and value without compromising a credential's or the system's security. For example, this can be achieved by encrypting and decrypting data with a set of keys that are common to both the card and a layer in the transaction system. In one embodiment, the transaction system may be configured to encrypt a credential with a known key and reference that key with an alias that is stored on the card and read before each data exchange. In some embodiments, the transaction system may be configured to perform the encryption process during what appears from the outside (e.g., to a signal or data sniffer) to be a random number of data exchanges. In other embodiments, a key can be compared to an electronic version of a check register that counts the switches to the key for comparison to a similar count stored elsewhere by the system for additional security.

Figure 1:
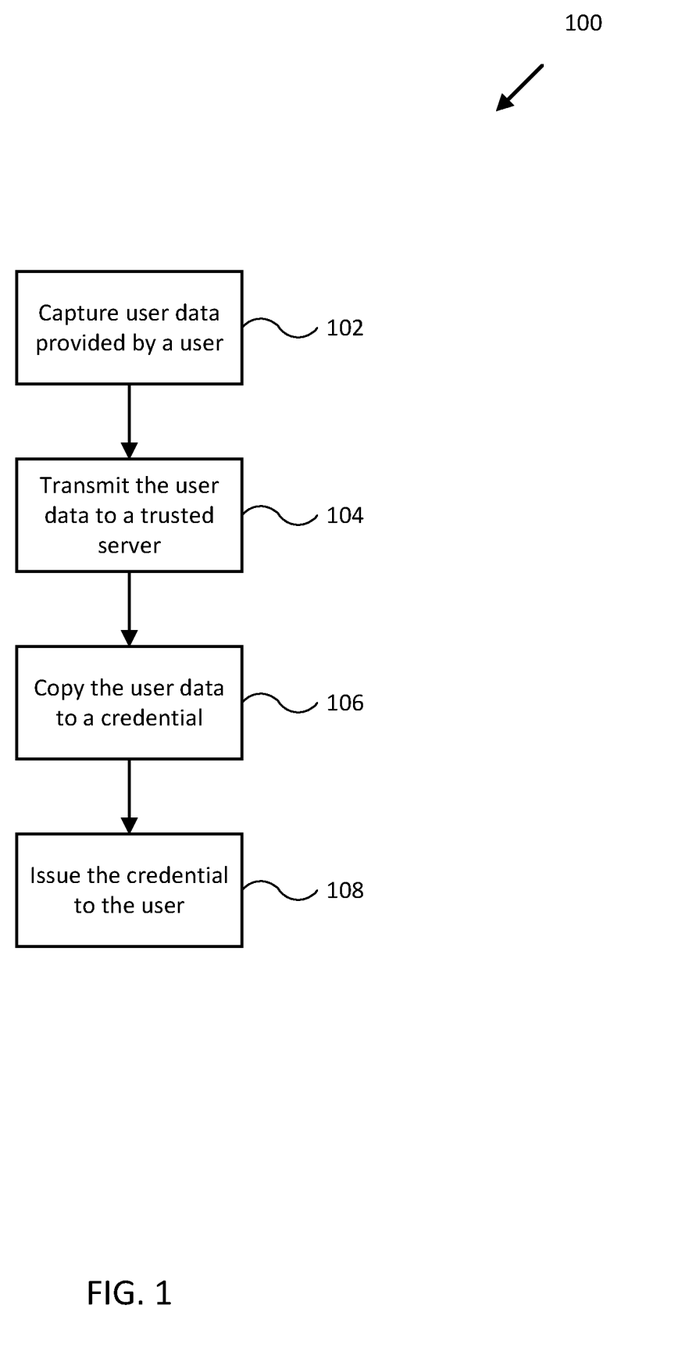
FIG. 1 is a flowchart showing a process for enrolling a user in accordance with an embodiment of the disclosure.

FIG. 1 is a flowchart showing a process 100 for enrolling a user prior to the user conducting secured transactions between the user and a service provider interface, such as a webserver, for example, or a type of POS. For example, a user may wish to make a purchase or participate in a pay-for service that requires age verification, citizenship verification, gender verification, asset or value verification, or other type of verification that segregates users (e.g., into users allowed or not allowed to transact) according to a personal characteristic of each user. A user may enroll in a system facilitating such transactions by providing user information to an issuer of a credential accepted by the service provider and its transaction system.

At block 102, an issuer captures user data provided by a user. For example, a user may provide user information, such as a driver's license, passport, or other user-provided identification document, to an issuer, where the issuer is a computer, server, POS, or other electronic device capable of interfacing with the user. In one embodiment, the issuer may include a capture device configured to scan or otherwise capture user data by converting the user information into digitized data. For example, the issuer may be adapted to scan a user's driver's license, perform optical character recognition (OCR) on the scan, and capture the resulting image and OCR data as user data. In another embodiment, the issuer may include a biometric interface configured to capture biometric data associated with the user (e.g., user data) by converting a biometric modality of the user into digitized data. For example, biometric data may correspond to substantially unique characteristics of a user's face, fingerprint, voice, eye, or other biometric modality that can be captured by a biometric interface. In a further embodiment, the issuer may be adapted to capture user data comprising a PIN or other alphanumeric sequence chosen by the user. Captured user data may be stored locally temporarily to facilitate further processing according to process 100. In some embodiments, user data may be encrypted by the issuer, the capture device, or the biometric interface, for example, prior to storing it locally.

At block 104, an issuer transmits the captured user data to a trusted server. In one embodiment, the transmission may be communicated over one or more networks, for example, and the trusted server may be implemented as a server situated far from the issuer, which may or may not be operated by the same business entity operating the issuer. In other embodiments, the trusted server may comprise a software application running on the same computing device as the issuer and may accept user data transmitted between layers or modules all within a common computing device.

Once the user data is transmitted to the trusted server, the trusted server may be configured to store the user data as secure data on the trusted server, for example, or may be configured to incorporate other data into both the secure data and the user data. The other data may be related to the issuer, the user, a service provider, a service provider interface, or the transmission, for example, such as session-specific data indicating the time, place, or manner in which user data was transmitted to the trusted server. Once the other data is incorporated into the user data, the trusted server may be configured to synchronize the updated user data between the trusted server, the issuer, and/or a credential to be issued to a user. In some embodiments, user data and/or secure data may be encrypted by the issuer or the trusted server prior to storage or transmission.

In one embodiment, the issuer and/or the trusted server may further be configured to generate and/or incorporate an encryption key or key pair into the user data and synchronize the updated user data between two or more devices of an enrollment system. The encryption key or key pair may be associated with the user data, the issuer, the trusted server, the service provider, session specific data associated with transmissions between the issuer and the trusted server, or the credential to be issued to the user, for example. In another embodiment, the issuer and/or the trusted server may be configured to incorporate a transaction application associated with one or more service providers and/or service provider interfaces into user data and synchronize the updated user data between two or more devices of an enrollment system.

At block 106, an issuer copies user data to a credential. For example, the issuer may include a credential interface and be configured to copy user data to one or more credentials to be issued to a user. In one embodiment, a credential may comprise a smart card or a SAM, for example, where the smart card or SAM includes a microprocessor and memory configured to communicate with the credential interface and/or a device coupled to the credential interface (e.g., an issuer), accept user data, and store user data on the smart card memory. In other embodiments, the credential may comprise a personal memory storage device, such as a SIM card, USB dongle or token, or SD card, for example, and the issuer may be configured to use the credential interface to copy the user data directly to the credential. In further embodiments, the credential may comprise a data file incorporating the user data that is adapted to be stored on a personal memory storage device, such as a smart phone, thumb drive, laptop computer, personal computer, music player, or portable gaming device, for example. In some embodiments, the user data may be encrypted by the issuer, the credential interface, or the credential itself, for example, prior to transmitting it to, or storing it on, the credential. In one embodiment, block 106 may occur prior to block 104.

At block 108, an issuer issues a credential to a user. For example, the issuer may include a credential interface configured to physically present a credential to a user or display a notification to a user indicating that the credential may be removed from the issuer. In some embodiments, a credential interface may be configured to personalize a credential prior to issuing it to a user. For example, a credential interface may include an apparatus for printing a user's name or image, an issuer's name or logo, a service provider's name or logo, or a serial number or other information associated with the enrollment of the user on the credential. Alternatively, a credential interface may be configured to name a data file (e.g., the credential) according to information associated with the enrollment of the user, in the process of issuing the credential to the user.

Figure 2:
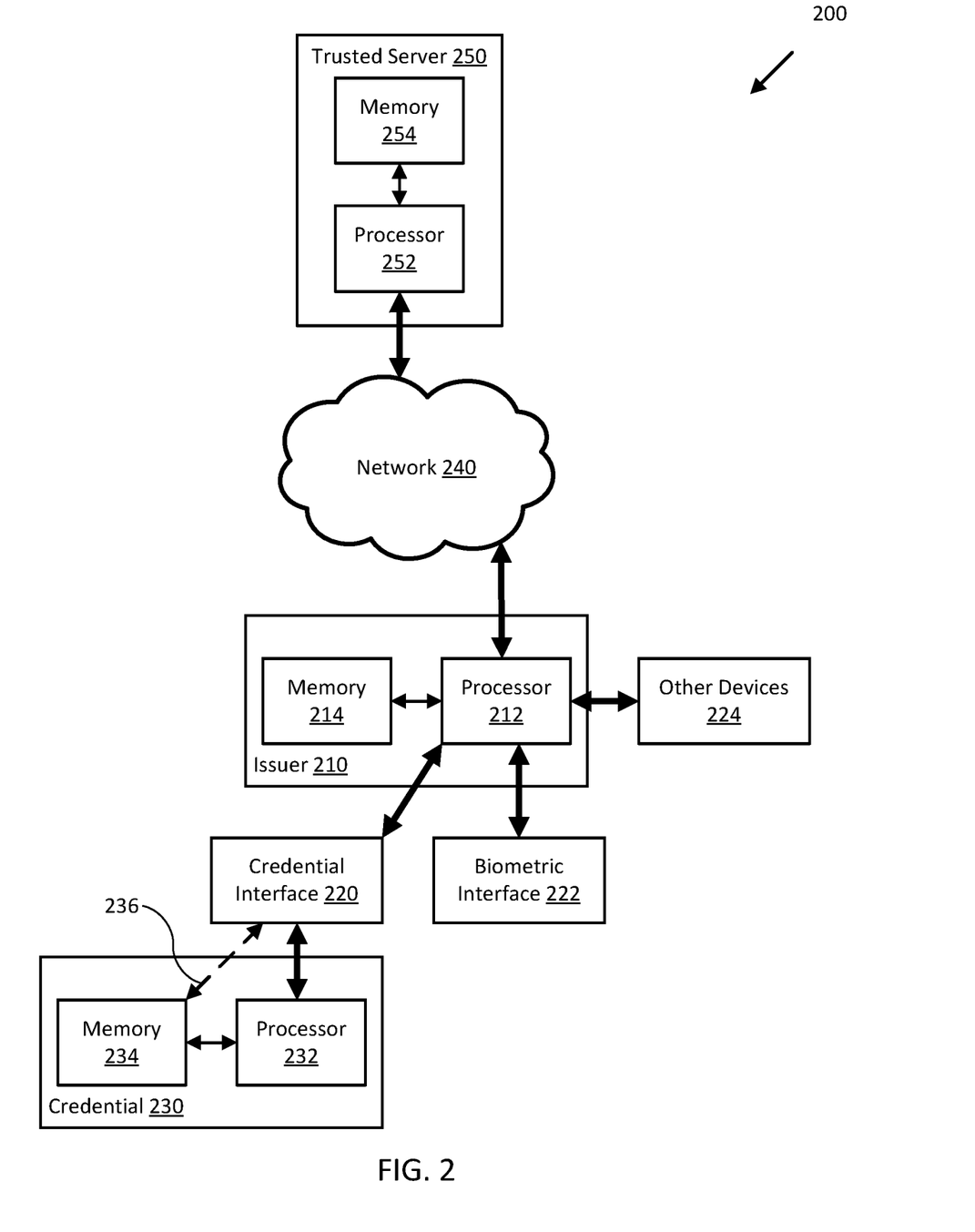
FIG. 2 is a block diagram of an enrollment system in accordance with an embodiment of the disclosure.

FIG. 2 is a block diagram of an enrollment system 200 adapted to enroll a user, in accordance with an embodiment of the disclosure. For example, enrollment system 200 may be adapted to enroll a user prior to the user conducting secured transactions between the user and a service provider interface, such as a webserver, for example, or a type of POS, in accordance with an embodiment of the disclosure. In the embodiment illustrated by FIG. 2, system 200 includes issuer 210 and trusted server 250 in communication over a network 240, and credential 230 in communication with issuer 210 over a communication link established with credential interface 220. In different embodiments, issuer 210 and trusted server 250 may be implemented as software applications residing on the same server, for example. In similar embodiments, issuer 210 and trusted server 250 may reside on the same server that provides a service provider interface. Although only one issuer and one trusted server are shown, a plurality of issuers and/or trusted servers may be utilized depending on, for example, the number of users and/or service providers participating in an enrollment process.

Issuer 210, credential 230, and trusted server 250 may each include one or more respective processors 212, 232, 252, respective memories 214, 234, 254, and other appropriate components for executing instructions such as program code and/or data stored on one or more computer readable mediums to implement the various applications, data, and processes described herein. For example, such instructions may be stored in one or more computer readable media such as memories or data storage devices internal and/or external to various components of system 200, and/or accessible over network 240.

Network 240 may be implemented as a single network or a combination of multiple networks. For example, in various embodiments, network 240 may include the Internet or one or more intranets, landline networks, wireless networks, and/or other appropriate types of networks. Issuer 210 and trusted server 250 may be implemented using any appropriate hardware and software configured for wired and/or wireless communication over network 240. For example, in one embodiment, issuer 210 and/or trusted server 250 may be implemented as a server, a personal computer (PC), a smart phone, personal digital assistant (PDA), laptop computer, and/or other types of computing devices capable of transmitting and/or receiving data, such as an iPad™ from Apple™.

Issuer 210 and trusted server 250 may include one or more applications (e.g., stored in respective memories 214 and 254) that may be used, for example, to provide interfaces for a user/consumer, an employee associated with issuer 210, and/or an employee associated with trusted server 250. The one or more applications can also be utilized to perform one or more of the processes described with respect to process 100 in FIG. 1 using one or more elements of system 200. For example, issuer 210 may be implemented with processor 212, which may be a microprocessor, a server processor, a virtual processor, or other processing device able to execute instructions such as program code and/or data stored on memory 214, for example, or transmitted to processor 212 over network 240 and/or credential interface 220.

As shown in FIG. 2, issuer 210 may be adapted to communicate with credential interface 220, biometric interface 222, and other devices 224 in order to transmit, receive, and capture data facilitating enrollment of a user. For example, biometric interface 222 may be a digital camera, a digitizing microphone, a fingerprint scanner, or other device configured to capture biometric data corresponding to one or more biometric modalities of a user and deliver the biometric data to issuer 210. Other devices 224 may include a scanner, a magnetic strip reader, or any type of capture device configured to capture user data by converting user information, such as a user-provided identification document, into digitized data, for example, and to deliver the user data to issuer 210. Other devices 224 may also include a display, a speaker, keyboard, mouse, or other interface device configured to capture direct user input (e.g., user data), such as a PIN or other alphanumeric sequence, for example, or to provide feedback to a user and/or an employee associated with the issuer.

Credential interface 220 may be a card reader, a USB port, an SD interface, or other interface configured to establish a communication link, which may be a wired or wireless (e.g., Bluetooth, RFID, NFC) communication link, between issuer 210 and credential 230. In one embodiment, credential interface 220 may be configured to establish a communication link between processor 212 of issuer 210 and processor 232 or directly to memory 234 (e.g., using direct communication link 236, shown as a dashed line in FIG. 2) of credential 230. Upon establishing such communication link, processor 212 of issuer 210 may be adapted to copy user data obtained through use of biometric interface 222 and/or other devices 224 to credential 230. In some embodiments, processor 212 may be adapted to incorporate an encryption key or key pair, a transaction application, or other data into the user data prior to copying the updated user data to credential 230. In other embodiments, processor 212 may be adapted to copy user data to credential 230 that is synchronized with updated data provided by trusted server 250.

In one embodiment, credential interface 220 may be adapted to personalize credential 230 by printing information associated with the enrollment of a user on the credential, for example, or by naming a data file (e.g., the credential) according to information associated with the enrollment of the user, prior to issuing the credential to the user.

Credential 230 may be implemented in a variety of different forms adapted to a particular need of a user, an issuer, and/or a service provider. In some embodiments, credential 230 may be implemented as a smart card, SAM, SD card, SIM card, USB dongle or token, or other personal memory storage device, for example. In such embodiments, credential 230 may be used to store user data copied from issuer 210 for use by a user, for example, when entering into a transaction with a service provider interface. In other embodiments, credential 230 may be implemented as a data file, for example, that is issued to and stored on a smart phone, thumb drive, laptop computer, personal computer, music player, portable gaming device, or other personal memory storage device. In such embodiments, credential 230 may be accessed in association with a user entering into a transaction with a service provider. In some embodiments, a user may provide a personal memory storage device to credential interface 220 in order to store credential 230 on the user's personal memory storage device.

As shown in FIG. 2, credential 230 may include processor 232, which may be implemented as a microprocessor or other processing device able to execute instructions such as program code and/or data stored on memory 234, for example, or transmitted to processor 232 over credential interface 220. Such instructions may be executed by processor 232 to implement the various applications, data, and processes described herein.

For example, processor 232 may be adapted to execute instructions to encrypt and decrypt user data stored in memory 234, for example, according to an encryption key or key pair associated with enrollment of a user. Processor 232 may also be adapted to execute instructions to control aspects of credential interface 220, for example, such as changing a color of an indicator on credential interface 220 to indicate success or failure of an encryption process, decryption process, storage process, or other process described herein. In one embodiment, processor 232 may be adapted to generate an encryption key or encryption key pair to facilitate secure communication with, for example, trusted server 250. In other embodiments, credential 230 may not include processor 232 and instead provide memory 243 for direct storage of user data, for example, such as with an SD card. In further embodiments, credential 230 may be implemented as a data file containing user data, for example, and not include processor 232 and memory 234.

Trusted server 250 may be configured to communicate with issuer 210 and/or credential 230 (e.g., through issuer 210 and credential interface 220), for example, in order to transmit and receive data facilitating enrollment of a user. For example, trusted server 250 may be implemented with processor 252, which may be a microprocessor, a server processor, a virtual processor, or other processing device able to execute instructions such as program code and/or data stored on memory 254, for example, or transmitted to processor 252 over network 240. In one embodiment, processor 254 of trusted server 250 may be adapted to receive user data captured by issuer 210 and store the user data as secure data in memory 254. In some embodiments, processor 254 may be configured to generate an encryption key or encryption key pair to facilitate secure communication with, for example, issuer 210, credential 230, and/or a service provider interface. The encryption key or key pair may be associated with the user data, the issuer, the trusted server, session specific data associated with transmissions between the issuer and the trusted server, or the credential eventually issued by the issuer, for example. In such embodiments, processor 254 may be adapted to incorporate an encryption key or encryption key pair into user data received from issuer 210 and synchronize the updated user data between the secured data stored in memory 254, the user data stored on issuer 210, and/or the user data stored on credential 230. In other embodiments, processor 254 may be adapted to incorporate a transaction application or other data into user data received from issuer 210 and synchronize the updated user data between the various devices and memories of system 200.

Figure 3:
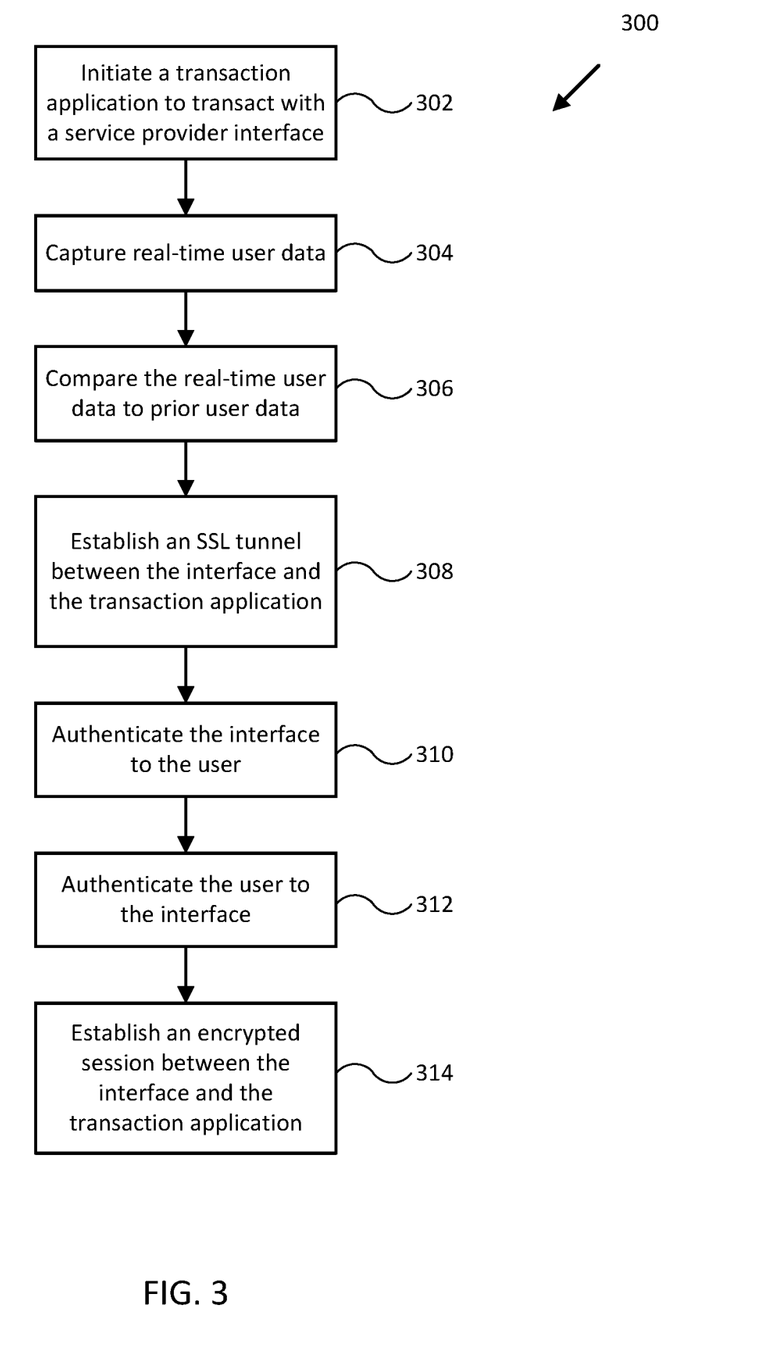
FIG. 3 is a flowchart showing a process for securing transactions in accordance with an embodiment of the disclosure.

FIG. 3 is a flowchart showing a process 300 for securing transactions between a user and a service provider interface, such as a webserver, for example, or a type of POS, in accordance with an embodiment of the disclosure. For example, a user may wish to make a purchase or participate in a pay-for service that requires various types of user identify verifications and one or more irrevocable or non-repudiable transactions. A user may participate in the transactions securely by interacting with a transaction application (e.g., a software application) that is adapted to interface with a credential issued to the user and authenticate the parties to the transaction.

A transaction application may be executed by a user device, for example, such as a personal electronic device (e.g., a smart phone, a laptop computer, a personal computer), a retail terminal, a kiosk terminal, a vending machine, or other POS that includes a user interface. In some embodiments, portions of a transaction application may be executed in a distributed manner by one or more of a user device, a credential, and a service provider interface, such as a webserver. In various embodiments, a transaction application may be uploaded to a user device from a credential issued to the user. In other embodiments, a transaction application may be uploaded to one or more user devices or interfaces by a webserver or other service provider interface. A service provider interface may be configured to log session-specific data associated with an upload, such as a time, place, manner, and serial number of the transaction application, for example, and transmit the session-specific data to a trusted server.

At block 302, a transaction application is initiated in order to transact with a service provider interface (e.g., a webserver). For example, a user may direct a user device to begin execution of a transaction application that has been uploaded to the user device. The transaction application may be configured to then communicate with an associated service provider interface and present a logon prompt or other initiation prompt to a user, using a display of a user device, for example, that directs the user to supply user data to the transaction application. In some embodiments, a user is directed to couple a credential issued to the user to a credential interface of a user device executing the transaction application. In one embodiment, the user data may include prior user data stored on a credential issued to the user. In other embodiment, the user data may include registration data, a username, a password, or other unique user identification data that may be separate from prior user data stored on a credential.

At block 304, a transaction application captures real-time user data as part of a verification process adapted to verify that the current user of the transaction application corresponds to a credential provided to the transaction application, for example, or to verify one or more characteristics of the user meet one or more limitations set by a service provider. For example, the transaction application may be configured to communicate with a capture device, coupled to a user device or user interface, for instance, that is configured to scan or otherwise capture real-time user data by converting user information (e.g., a user-provided identification document) into digitized data. In another embodiment, the transaction application may be configured to communicate with a biometric interface that is configured to capture real-time biometric data associated with the user (e.g., real-time user data). In a further embodiment, the transaction application may be configured to capture real-time user data replicating a PIN or other alphanumeric sequence previously chosen by the user. Captured real-time user data may be stored temporarily, in a user device, for example, to facilitate further processing according to process 300. In some embodiments, real-time user data may be encrypted by the transaction application, a capture device, or a biometric interface, for example, prior to storing the real-time user data.

At block 306, a transaction application compares real-time user data to prior user data. For example, the transaction application may be configured to communicate with a credential interface that is adapted to transmit and receive data to/from one or more credentials issued to a user. In one embodiment, the transaction application may be configured to copy prior user data from a credential and compare it to real-time user data provided in block 304 to determine whether the current user corresponds to the credential. In a separate embodiment, the transaction application may be configured to transmit real-time user data to a credential and direct the credential to perform a comparison and reply with verification data indicating whether the current user corresponds to the credential. In a further embodiment, the transaction application may be configured to transmit real time user data and prior user data to a service provider interface or a trusted server, where the service provider interface or trusted server compares the real-time user data to the prior user data and transmits the result of the comparison to the transaction application. Once the transaction application determines and/or receives the result of the comparison, the transaction application may be configured to present the result to the user, for example, using a display or other interface of a user device.

In some embodiments, the transaction application may be configured to enter a verification failure mode when the current user does not correspond to the credential, for example, or when one or more personal characteristics of the user renders the user "not allowed" to transact with the service provider, such as when an age of the user is less than that required to purchase adult content or participate in a particular pay-for service. When entering a verification failure mode, the transaction application may be configured to perform one or more steps to notify the current user of the failure, for example, such as presenting a verification failure indication to the current user, prompting the current user to retry a prior verification step, including re-capturing real-time user data, and/or terminating execution of the transaction application.

At block 308, a transaction application establishes a secure sockets layer (SSL) tunnel between a service provider interface and the transaction application. Upon successful verification of a user in block 306, the transaction application may be configured to communicate with a service provider interface in order to establish the SLL tunnel. In one embodiment, the transaction application and the service provider interface (e.g., a webserver, a POS) may be executed by the same device, and the SSL tunnel may be established internally/virtually between the separately executing layers or modules. In some embodiments, the service provider interface may be configured to log session-specific data associated with the SSL tunnel and provide the session-specific data to a trusted server, where the session-specific data is associated with the service provider, the service provider interface, the prior user data, the credential, the user device, and/or the transaction application. In one embodiment, the log may be incorporated into the secure data associated with the prior user data. In other embodiments, block 308 may be omitted from process 300.

At block 310, a transaction application authenticates a service provider interface (e.g., a webserver) to a user. For example, the transaction application may be configured to transmit prior user data stored on a credential to a trusted server, where the trusted server is adapted to verify the identity of the service provider interface and transmit verification data back to the transaction application. Upon receiving the verification data, the transaction application may be configured to receive and/or derive a result of the service provider interface identity verification from the verification data. The trusted server may verify the identity of the service provider interface by selecting secure data that is associated with the prior user data, and then determining whether attributes of the service provider interface (e.g., a service provider name, an IP address, an encryption key or key pair, a shared secret) correspond to expected attributes stored on the trusted server and associated with/incorporated into the secure data.

For example, the prior user data and secure data may include data indicating an expected service provider/interface that may participate in secured transactions with the user. The trusted server may be configured to transmit invalid verification data back to the transaction application when the service provider/interface associated with the present authentication process is not the expected service provider/interface.

In some embodiments, the transaction application may be configured to derive attributes of the present service provider interface from various communications with the service provider interface, for example, or from the SSL tunnel established in block 308. The transaction application may be configured to transmit the derived attributes to the trusted server along with the prior user data. In one embodiment, the transaction application may be configured to communicate with the trusted server through the SSL tunnel established in block 308, which may automatically provide attributes of the service provider interface to the trusted server.

In other embodiments, the transaction application may be configured to transmit prior user data to the trusted server along with a request for secure data and/or other data associated with the prior user data, the SSL tunnel, the transaction application, or the service provider/interface, for example. The transaction application may then verify the service provider interface by comparing the prior user data, secure data, and/or the other data to determine whether the present service provider/interface is the expected service provider/interface.

In order to secure the authentication process, the trusted server, the transaction application, and/or the credential may be configured to encrypt and/or decrypt one or more of the above transmissions according to information (e.g., an encryption key or key pair) stored on the credential and/or the trusted server, as indicated to the trusted server by the prior user data transmitted by the transaction application. For example, in one embodiment, the credential may provide encrypted prior user data to the transaction application, which may then provide it to the trusted server. The trusted server may then decrypt the prior user data to determine the associated secure data, other data, and/or verification data, encrypt one or more of them, and then transmit the encrypted data to the transaction application. The transaction application may then provide the encrypted data to the credential, which may decrypt the data, receive a result of the service provider interface identity verification, and provide the result to the transaction application or a user. For example, a credential may be configured to control an LED indicator of a credential interface, or another aspect associated with a user device, to indicate the result to the user without interacting with the transaction application. In this manner, the transaction application may authenticate the webserver to the user without being privy to the information in the prior user data, the secure data, the other data, or the verification data, for example. In other embodiments, the transaction application may encrypt and decrypt data transmitted and/or received by the trusted server and have access to the data in the clear.

At block 312, a transaction application authenticates a user to a service provider interface (e.g., a webserver). For example, the transaction application may be configured to transmit prior user data and/or real-time user data to a service provider interface, where the service provider interface is adapted to transmit the data to a trusted server, and where the trusted server is adapted to verify the identity of the user and transmit verification data back to the service provider interface. Upon receiving the verification data, the transaction application may be configured to receive and/or derive a result of the user identity verification from the verification data. The trusted server may verify the identity of the user by selecting secure data that is associated with the prior user data, and then determining whether characteristics of the user (e.g., in the prior user data and/or the real-time user data, a user name or ID number, an encryption key or key pair, a shared secret, biometric data) correspond to expected characteristics stored on the trusted server and associated with/incorporated into the secure data.

In other embodiments, the service provider interface may be configured to transmit prior user data and/or real-time user data to the trusted server along with a request for secure data and/or other data associated with the prior user data, the SSL tunnel, the transaction application, or the service provider/interface, for example. The service provider interface may then verify the user by comparing the prior user data, the real-time user data, the secure data, and/or the other data to determine whether the present user is the expected user (e.g., the user corresponding to the supplied credential).

In order to secure the authentication process, the trusted server, the transaction application, the credential, and/or the service provider interface may be configured to encrypt and/or decrypt one or more of the above transmissions according to information (e.g., an encryption key or key pair) stored on the credential, the service provider interface, and/or the trusted server, as indicated to the trusted server by received prior user data and/or other data associated with the service provider/interface. In some embodiments, the service provider interface may be configured to communicate with the transaction application through an SSL tunnel established according to block 308.

At block 314, a transaction application establishes an encrypted session between a service provider interface (e.g., a webserver) and the transaction application. For example, the transaction application may be configured to establish an encrypted session between a service provider interface and the transaction application that is adapted to authenticate transactions between the user accessing the transaction application and the service provider interface. In some embodiments, the transaction application and/or a credential may be configured to establish a unique encrypted session key or key pair shared between the service provider interface and the credential. In further embodiments, the encrypted session key may be used to digitally sign each one of a series of transactions between the transaction application, the credential, and/or the service provider interface. For example, a transaction application may be configured to poll the presence and/or contents of a credential, or capture real-time user data for comparison to prior user data, for example, for each transaction between a user accessing the transaction application and a service provider interface. In some embodiments, one or more of the validated and secured user transactions can be considered an irrevocable or non-repudiable transaction.

Figure 4:
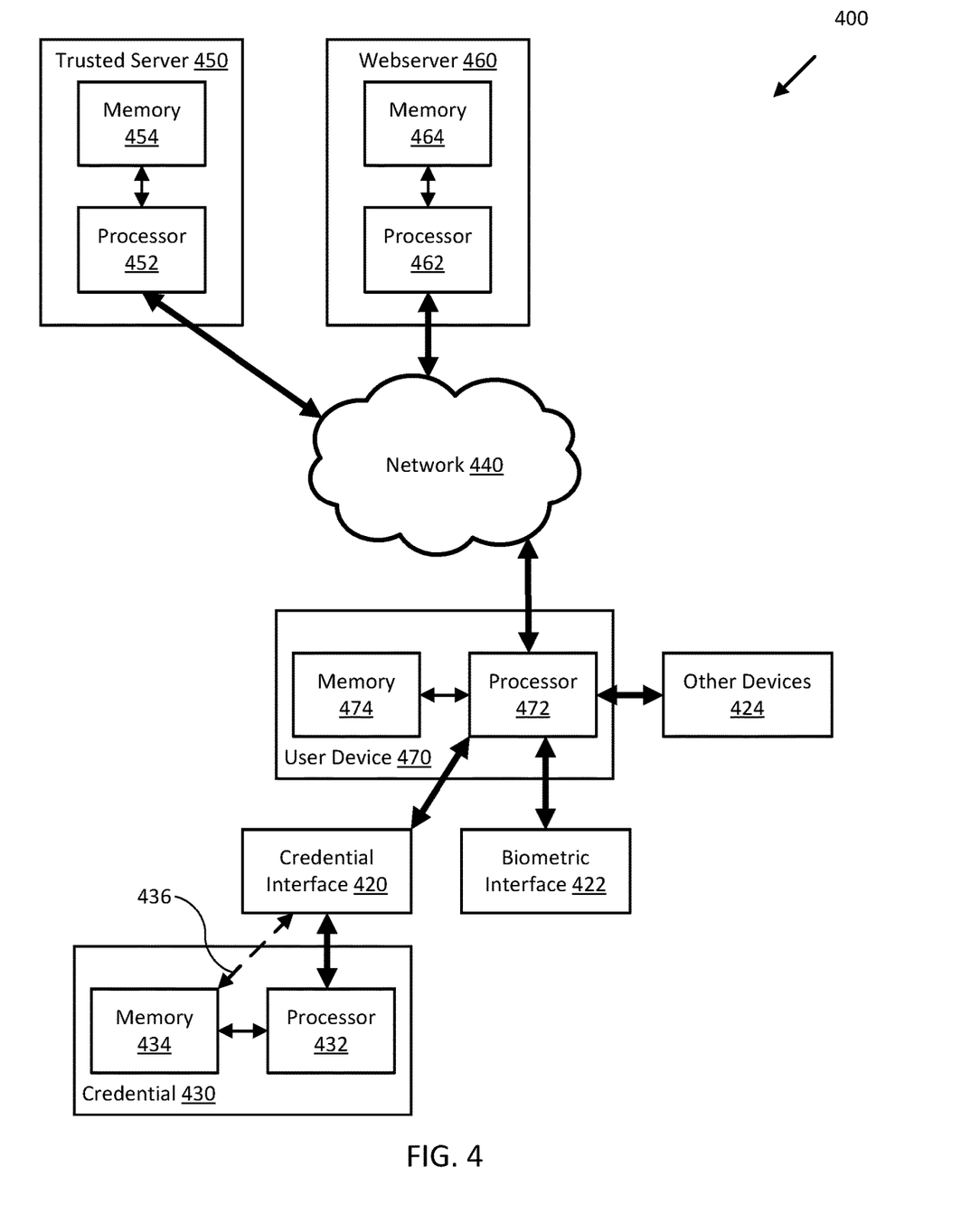
FIG. 4 is a block diagram of a transaction system in accordance with an embodiment of the disclosure.

FIG. 4 is a block diagram of a secured transaction system 400 adapted to conduct secured transactions between a user and a service provider interface, such as a webserver, for example, or a type of POS, in accordance with an embodiment of the disclosure. For example, system 400 may be adapted to secure transactions between a user and a service provider interface after a user has been enrolled in a service provider's transaction system and issued a credential.

In the embodiment illustrated by FIG. 4, system 400 includes user device 470, webserver 460 (e.g., a service provider interface) and trusted server 450 in communication over a network 440, and credential 430 in communication with user device 470 over a communication link established with credential interface 420. In different embodiments, one or more of user device 470, webserver 460, and trusted server 450 may be implemented as software applications residing on the same server, for example. In similar embodiments, one or more of user device 470, web server 460, and trusted server 450 may reside on the same server that acts as an issuer, such as issuer 210 in FIG. 2. Although only one user device, one webserver, and one trusted server are shown, a plurality of devices and/or servers may be utilized depending on, for example, the number of users and/or service providers participating in secured transactions.

User device 470, webserver 460, credential 430, and trusted server 450 may each include one or more respective processors 472, 462, 432, 452, respective memories 474, 464, 434, 454, and other appropriate components for executing instructions such as program code and/or data stored on one or more computer readable mediums to implement the various applications, data, and processes described herein. For example, such instructions may be stored in one or more computer readable media such as memories or data storage devices internal and/or external to various components of system 400, and/or accessible over network 440.

Network 440 may be implemented as a single network or a combination of multiple networks. For example, in various embodiments, network 440 may include the Internet or one or more intranets, landline networks, wireless networks, and/or other appropriate types of networks. User device 470, webserver 460, and trusted server 450 may be implemented using any appropriate hardware and software configured for wired and/or wireless communication over network 440. For example, in one embodiment, one or more of user device 470, webserver 460, and trusted server 450 may be implemented as a server, a personal computer (PC), a smart phone, personal digital assistant (PDA), laptop computer, and/or other types of computing devices capable of transmitting and/or receiving data.

User device 470, webserver 460, and trusted server 450 may include one or more applications (e.g., stored in respective memories 474, 464 and 454) that may be used, for example, to provide interfaces for a user/consumer, an employee associated with webserver 460, and/or an employee associated with trusted server 250. The one or more applications can also be utilized to perform one or more of the processes described with respect to process 300 in FIG. 3 using one or more elements of system 400. For example, user device 470 and/or webserver 460 may each be implemented with a respective processor 472 and/or 462, which may be a microprocessor, a server processor, a virtual processor, or other processing device able to execute instructions such as program code and/or data stored on memories 474 and/or 464, for example, or transmitted to processors 472 and/or 462 over network 440 and/or credential interface 420.

As shown in FIG. 4, user device 470 may be adapted to communicate with credential interface 420, biometric interface 422, and other devices 424 in order to transmit, receive, and capture real-time user data corresponding to a user accessing user device 470. Processor 472 of user device 470 may be adapted to execute a transaction application, for example, such as transaction application performing one or more processes described with respect to process 300 of FIG. 3. In one embodiment, processor 472 may be configured to verify a characteristic of a user, establish an SSL tunnel between webserver 460 and a transaction application, authenticate webserver 460 to a user and a user to webserver 460, and/or establish an encrypted session between webserver 460 and a transaction application, for example, all according to one or more processes described in relation to process 300 of FIG. 3.

Credential interface 420, biometric interface 422, and other devices 424 may correspond respectively to credential interface 220, biometric interface 222, and other devices 224 of FIG. 2, and can include similar attributes and be configured to operate similarly. In addition, biometric interface 422 may be implemented as a device configured to capture real-time biometric data corresponding to one or more biometric modalities of a user and deliver the real-time biometric data to user device 470. Other devices 424 may include any type of capture device configured to capture real-time user data by converting user information into digitized data and to deliver the user data to user device 470. Other devices 424 may also include any interface device configured to capture direct user input (e.g., real-time user data) or to provide feedback to a user.

Credential interface 420 may be configured to establish a communication link, which may be a wired or wireless communication link, between user device 470 and credential 430. In one embodiment, credential interface 420 may be configured to establish a communication link between processor 472 of user device 470 and processor 432 or directly to memory 434 (e.g., using direct communication link 436, shown as a dashed line in FIG. 4) of credential 430. Upon establishing such communication link, processor 472 of user device 470 may be adapted to transmit and receive data (e.g., prior user data, real-time user data) to/from credential 430. In some embodiments, processor 472 may be adapted to incorporate an encryption key or key pair, a transaction application, or other data into real-time user data and/or prior user data prior to transmitting the updated user data to another device of system 400.

Credential 430 may correspond to credential 230 in FIG. 2, and can include similar attributes and be configured to operate similarly. For example, credential 430 may include processor 432, which may be implemented as a microprocessor or other processing device able to execute instructions such as program code and/or data stored on memory 434, for example, or transmitted to processor 432 over credential interface 420. Such instructions may be executed by processor 432 to implement the various applications, data, and processes described herein. In addition, processor 432 may be configured to upload a transaction application to user device 470, verify a characteristic of a user, authenticate webserver 460 to a user and a user to webserver 460, and/or establish an encrypted session between webserver 460 and a transaction application, for example, all according to one or more processes described in relation to process 300 of FIG. 3.

Trusted server 450 may correspond to trusted server 450 in FIG. 2, and can include similar attributes and be configured to operate similarly. In addition, trusted server 450 may be configured to communicate with user device 470, webserver 460, and/or credential 430 (e.g., through user device 470 and credential interface 420), for example, in order to transmit and receive data facilitating secured transactions between a user accessing a transaction application and a service provider interface (e.g., webserver 460). For example, processor 452 may be configured to verify a characteristic of a user and/or authenticate webserver 460 to a user and a user to webserver 460, for example, all according to one or more processes described in relation to process 300 of FIG. 3. Additionally, processor 452 may be configured to receive data from one or more of user device 470, webserver 460, and credential 430 and incorporate or otherwise associate the data with secure data corresponding to a particular user. Processor 452 may also be configured to encrypt and/or decrypt transmissions between trusted server 450 and one or more of the other devices of system 400 communicatively coupled to trusted server 450, for example, utilizing an encryption key or key pair. In some embodiments, the encryption key or key pair may be stored, at least in part, on credential 430, trusted server 450, webserver 460, and/or user device 470.

Webserver 460 may be configured to communicate with user device 470, trusted server 450, and/or credential 430 (e.g., through user device 470 and credential interface 420), for example, in order to transmit and receive data facilitating secured transactions between a user accessing a transaction application and a service provider interface (e.g., webserver 460). In some embodiments, processor 462 may be configured to upload a transaction application to user device 470, verify a characteristic of a user, establish an SSL tunnel between webserver 460 and a transaction application, authenticate web server 460 to a user and a user to webserver 460, and/or establish an encrypted session between webserver 460 and a transaction application, for example, all according to one or more processes described in relation to process 300 of FIG. 3. Processor 462 may also be configured to encrypt and/or decrypt transmissions between webserver 460 and one or more of the other devices of system 400 communicatively coupled to webserver 460, for example, utilizing an encryption key or key pair. In some embodiments, the encryption key or key pair may be stored, at least in part, on credential 430, trusted server 450, webserver 460, and/or user device 470.

One or more processors and other components of system 200 of FIG. 2 and system 400 of FIG. 4 perform specific operations by executing sequences of instructions contained in one or more memories of systems 200 and 400. Logic may be encoded in a computer readable medium, which may refer to any medium that participates in providing instructions to processors for execution. Such a medium may take many forms, including but not limited to, non-volatile media, volatile media, and transmission media. In various implementations, non-volatile media includes optical or magnetic disks, volatile media includes dynamic memory, and transmission media includes coaxial cables, copper wire, and fiber optics. In one embodiment, logic may be encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by one or more elements of system 400. In various other embodiments of the present disclosure, a plurality of systems 400 coupled to network 440 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for securing transactions, the method comprising:
    acquiring biometric data of a user, via a user device executing a transaction application installed on the user device, wherein the user device is configured to interact with a service provider interface;
    transmitting, by the user device executing the transaction application, the acquired biometric data of the user and prior user data stored on a credential issued to the user to the service provider interface, wherein the service provider interface compares the acquired biometric data of the user with the prior user data;
    receiving, by the user device executing the transaction application, verification data from the service provider interface indicating that the user corresponds to the credential;
    in response to receiving the verification data, establishing, by the user device executing the transaction application, an encrypted communications tunnel between the service provider interface and the transaction application;
    transmitting, by the user device executing the transaction application, the prior user data with attributes of the service provider interface to a trusted server configured to operate separately from the service provider interface;
    receiving, by the user device executing the transaction application, secondary verification data corresponding to the attributes of the service provider interface from the trusted server;
    in response to receiving the secondary verification data, authenticating, by the user device executing the transaction application, the service provider interface and the user with the trusted server;
    establishing, by the user device executing the transaction application, an encrypted session between the service provider interface and the transaction application;
    receiving, via the established encrypted session by the user device executing the transaction application, an encrypted session key generated and sent from the trusted server; and
    authenticating using the encrypted session key, by the user device executing the transaction application, a transaction between the user device and the service provider interface.

2. The method of claim 1, wherein the prior user data comprises user information associated with a driver's license, a passport, or other user-provided identification document.

3. The method of claim 1, wherein the verification data comprise a verification that the biometric data matches the prior user data in at least one of an age verification, a citizenship verification, a gender verification, an asset verification, or a value verification.

4. The method of claim 1, further comprising:
    uploading the transaction application from the service provider interface or the credential to the user device prior to acquiring the biometric data;
    logging session-specific data associated with the uploading; and
    transmitting the session-specific data to the trusted server.

5. The method of claim 1, further comprising:
    receiving, via the user device executing the transaction application, a result of the comparing; and
    presenting, via the user device executing the transaction application, the result to the user.

6. The method of claim 1, wherein authenticating the service provider interface and the user with the trusted server comprises:
    transmitting, by the user device executing the transaction application, the prior user data to the trusted server through the encrypted communications tunnel to the service provider interface, wherein the trusted server is configured to verify an identity of the service provider interface and transmit verification data encrypted according to information stored with the credential.

7. The method of claim 1, wherein authenticating the service provider interface and the user with the trusted server comprises:
    transmitting, by the user device executing the transaction application, the prior user data through the encrypted communications tunnel to the service provider interface, wherein the service provider interface transmits the prior user data to the trusted server, and wherein the trusted server is configured to verify the identity of the user and transmit verification data to the service provider interface; and receiving, by the user device executing the transaction application, a result derived from the verification data.

8. The method of claim 1, wherein establishing the encrypted session comprises:
sharing the encrypted session key between the service provider interface and the credential; and
digitally signing the transaction with the encrypted session key.

9. A system comprising:
a user device comprising:
a processor, and
a memory storing programmable instructions, when executed by the processor, cause the processor to perform operations comprising:
initiating a transaction application installed on the user device configured to interact with a service provider interface;
acquiring, via the transaction application, biometric data of a user;
transmitting, via the transaction application, the acquired biometric data of the user and prior user data stored on a credential issued to the user to the service provider interface, wherein the service provider interface compares the acquired biometric data of the user with the prior user data;
receiving, via the transaction application, verification data from the service provider interface indicating that the user corresponds to the credential;
in response to receive the verification data, establishing, via the transaction application, an encrypted communications tunnel between the service provider interface and the transaction application;
transmitting, via the transaction application, the prior user data with attributes of the service provider interface to a trusted server configured to operate separately from the service provider interface;
receiving, via the transaction application, secondary verification data corresponding to the attributes of the service provider interface from the trusted server;
in response to receiving the secondary verification data, authenticating, via the transaction application, the service provider interface and the user with the trusted server;
establishing, by the transaction application, an encrypted session between the service provider interface and the transaction application;
receiving, via encrypted session from the transaction application, an encrypted session key generated and sent from the trusted server; and
authenticating using the encrypted session key, via the transaction application, a transaction between the user device and the service provider interface.

10. The system of claim 9, wherein the prior user data comprises user information associated with a driver's license, a passport, or other user-provided identification document.

11. The system of claim 9, wherein the prior user data are encrypted when stored or transmitted.

12. The system of claim 9, wherein the verification data comprise a verification that the biometric data with the prior user data in at least one of an age verification, a citizenship verification, a gender verification, an asset verification, or a value verification.

13. The system of claim 9, wherein the operations further comprise:
uploading the transaction application from the service provider interface or the credential to the user device prior to acquiring the biometric data;
logging session-specific data associated with the uploading; and
transmitting the session-specific data to the trusted server.

14. The system of claim 9, wherein the operations further comprise:
receiving, via the transaction application, a result of the comparing; and
presenting, via the transaction application, the result to the user.

15. The system of claim 9, wherein authenticating the service provider interface and the user with the trusted server comprises:
transmitting, via the transaction application, the prior user data to the trusted server through the encrypted communications tunnel to the service provider interface, wherein the trusted server is configured to verify an identity of the service provider interface and transmit verification data encrypted according to information stored on the credential.

16. The system of claim 9, wherein establishing the encrypted session comprises:
sharing the encrypted session key between the service provider interface and the credential; and
digitally signing a transaction between the transaction application installed on the user device and the service provider interface with the encrypted session key.

17. The system of claim 9, wherein the credential comprises a smart card or a secure access module (SAM).

18. A non-transitory machine-readable medium comprising a plurality of machine-readable instructions and a transaction application, when executed by one or more processors of a user device, cause the user device to perform operations comprising:
acquiring, biometric data of a user, via the user device, wherein the user device is configured to interact with a service provider interface;
transmitting, by the user device, the acquired biometric data of the user and prior user data stored on a credential issued to the user to the service provider interface, wherein the service provider interface compares the acquired biometric data of the user with the prior user data;
receiving, by the user device, verification data from the service provider interface indicating that the user corresponds to the credential;
in response to receiving the verification data, establishing, by the user device, an encrypted communications tunnel between the service provider interface and the transaction application;
transmitting, by the user device, the prior user data with attributes of the service provider interface to a trusted server configured to operate separately from the service provider interface;
receiving, by the user device, secondary verification data corresponding to the attributes of the service provider interface from the trusted server;
in response to receiving the secondary verification data, authenticating, by the user device, the service provider interface and the user with the trusted server;

establishing, by the user device, an encrypted session between the service provider interface and the transaction application;

receiving, by the user device via the established encrypted session, an encrypted session key generated and sent from the trusted server; and authenticating using the encrypted session key, by the user device, a transaction between the user device and the service provider interface.

19. The non-transitory machine-readable medium of claim 18, wherein the credential comprises a smart card or a secure access module (SAM), and the transaction application is uploaded to the user device from the credential.

* * * * *

UNITED STATES PATENT AND TRADEMARK OFFICE
CERTIFICATE OF CORRECTION

| | | |
|---|---|---|
| PATENT NO. | : 12,008,551 B2 | Page 1 of 1 |
| APPLICATION NO. | : 17/467130 | |
| DATED | : June 11, 2024 | |
| INVENTOR(S) | : Bruce Ross | |

It is certified that error appears in the above-identified patent and that said Letters Patent is hereby corrected as shown below:

On the Title Page

Item (63), Change "This application is a CON of 13/689,683 11/29/2012 PAT 11132672" to --This application is a CON of 13/689,683 11/29/2012 PAT 11132672 and claims benefit of 61/564,588 11/29/2011--

Signed and Sealed this
Ninth Day of July, 2024

Katherine Kelly Vidal
*Director of the United States Patent and Trademark Office*